(12) United States Patent
Albers et al.

(10) Patent No.: US 9,758,613 B2
(45) Date of Patent: Sep. 12, 2017

(54) METHOD FOR PRODUCING FOAMED MOLDED BODIES

(71) Applicant: Covestro Deutschland AG, Leverkusen (DE)

(72) Inventors: Reinhard Albers, Leverkusen (DE); Hans-Guido Wirtz, Leverkusen (DE); Michael Loof, Leverkusen (DE); Andreas Pielasch, Bergisch-Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 212 days.

(21) Appl. No.: 14/397,513

(22) PCT Filed: Apr. 26, 2013

(86) PCT No.: PCT/EP2013/058765
§ 371 (c)(1),
(2) Date: Oct. 28, 2014

(87) PCT Pub. No.: WO2013/164274
PCT Pub. Date: Nov. 7, 2013

(65) Prior Publication Data
US 2015/0133573 A1    May 14, 2015

(30) Foreign Application Priority Data

Apr. 30, 2012  (EP) .................................... 12166156

(51) Int. Cl.
| | |
|---|---|
| C08G 18/32 | (2006.01) |
| B05B 7/00 | (2006.01) |
| B29C 44/38 | (2006.01) |
| B29C 44/60 | (2006.01) |
| F16L 59/14 | (2006.01) |
| B05B 1/30 | (2006.01) |
| B05B 15/02 | (2006.01) |
| B29C 44/18 | (2006.01) |
| B29C 44/36 | (2006.01) |
| C08J 9/14 | (2006.01) |
| B29C 44/42 | (2006.01) |
| F25D 23/06 | (2006.01) |
| B29L 31/00 | (2006.01) |
| B29K 75/00 | (2006.01) |
| B29K 105/00 | (2006.01) |
| B29K 105/04 | (2006.01) |

(52) U.S. Cl.
CPC ........ C08G 18/3221 (2013.01); B05B 1/3026 (2013.01); B05B 7/0018 (2013.01); B05B 15/0233 (2013.01); B29C 44/18 (2013.01); B29C 44/362 (2013.01); B29C 44/38 (2013.01); B29C 44/42 (2013.01); B29C 44/60 (2013.01); C08G 18/3206 (2013.01); C08J 9/14 (2013.01); F16L 59/14 (2013.01); F25D 23/064 (2013.01); B29K 2075/00 (2013.01); B29K 2105/0005 (2013.01); B29K 2105/04 (2013.01); B29L 2031/7622 (2013.01); C08J 2205/10 (2013.01); C08J 2375/04 (2013.01)

(58) Field of Classification Search
CPC .............................. B29C 44/42; B29C 44/362
See application file for complete search history.

(56) References Cited

U.S. PATENT DOCUMENTS

| | | | |
|---|---|---|---|
| 2,761,565 A | 9/1956 | Hutchinson | |
| 2,764,565 A | 9/1956 | Hoppe et al. | |
| 5,296,517 A | 3/1994 | Wetzig et al. | |
| 6,337,041 B1 * | 1/2002 | Kuo | B29C 67/246 |
| | | | 264/138 |
| 6,472,449 B1 | 10/2002 | Heinemann et al. | |
| 6,926,040 B1 * | 8/2005 | Prescott | F16L 59/143 |
| | | | 138/113 |
| 2009/0209671 A1 * | 8/2009 | Emge | C08G 18/4072 |
| | | | 521/98 |
| 2010/0041782 A1 * | 2/2010 | Lehmann | C08G 18/161 |
| | | | 521/128 |
| 2011/0221085 A1 * | 9/2011 | Fiorentini | B29C 44/38 |
| | | | 264/40.1 |
| 2012/0214892 A1 * | 8/2012 | Kunst | C08G 63/914 |
| | | | 521/173 |

FOREIGN PATENT DOCUMENTS

| | | |
|---|---|---|
| DE | 19917787 A1 | 11/2000 |
| DE | 102008040598 A1 | 1/2010 |
| EP | 0565974 A1 | 10/1993 |
| EP | 2148156 A2 | 1/2010 |
| EP | 2366525 A1 | 9/2011 |
| WO | WO-2008/013731 A1 | 1/2008 |

OTHER PUBLICATIONS

International Search Report for PCT/EP2013/058765 mailed Aug. 5, 2013.

* cited by examiner

*Primary Examiner* — Melissa Rioja
(74) *Attorney, Agent, or Firm* — K&L Gates LLP (57) ABSTRACT

The invention relates to a method for producing foamed molded bodies comprising the steps of
  A) providing a mold, and
  B) introducing a foam-forming reaction mixture into the mold under variable pressure of injection,
wherein the method is characterized in that
the foam-forming reaction mixture has a fiber time of ≥20 s to ≤60 s.

23 Claims, 4 Drawing Sheets

METHOD FOR PRODUCING FOAMED MOLDED BODIES

CROSS-REFERENCE TO RELATED APPLICATIONS

This application is a national stage application (under 35 U.S.C. §371) of PCT/EP2013/058765, filed Apr. 26, 2013, which claims benefit of European Application No. 12166156.5, filed Apr. 30, 2012, both of which are incorporated herein by reference in their entirety.

The present invention relates to a method for producing foamed molded bodies comprising the steps of providing a mold and introducing a foam-forming reaction mixture into the mold.

Cavities to be insulated are currently insulated with polyurethane foams either continuously, as in the case of metal panels or insulation plates, or discontinuously, for example in the case of cooling appliances, pipes or discontinuous panels. Output rates for the insulating material used in such operations are constant and have to be within certain limits to meet the polyurethane foam structures, reactivity profiles and also mixing requirements for each particular application.

One example of a conventional process for producing insulating components for cooling appliances is that of their being filled in the tub position, where the appliance lies on its back and is filled either from the compressor stage or from the top region. A further example of a further developed conventional process is the "top flow" process wherein the reaction mixture is introduced upwardly into a mold and is thus able to spread over the floor of the mold.

DE 10 2008 040 598 A1 discloses a method of foaming out a hollow body, in particular a housing for a domestic cooling appliance, comprising the steps of placing an injection nozzle on an inlet opening of the hollow body, injecting a foam-former into the hollow body using the injection nozzle and allowing the injected foam-former to expand. In this method, the flight distance of the foam-former from the injection nozzle to a point of impact on an inside wall of the hollow body is reduced during the process of injection.

One way to vary the flight distance of the foam-former is to adjust the spraying direction of the injection nozzle during the process of injection. However, according to DE 10 2008 040 598 A1, it is preferable to reduce the flight distance of the foam former by reducing its exit speed at the injection nozzle and hence the jet energy for the foam material. This is stated to be accomplished with a nozzle having a variable opening cross section.

However, the disadvantage with this approach is that a specific nozzle is needed. This creates retrofitment costs and shutdown times on existing machinery.

EP 2 366 525 A1 discloses a process wherein a predetermined amount of a polyurethane mixture is injected into a mold by setting a first feed rate and injection velocity at the start for introduction into a first shooting zone which is furthest away from the injection point. Both the feed rate and the injection velocity are then reduced, so the polyurethane mixture are covered in one or more successive shooting zones between the most remote one and a final zone in the vicinity of the injection point. The metered amounts for coating various zones are kept the same and/or changed. According to claim 3, the injection flow rate of the polyurethane mixture may be gradually reduced between adjacent zones during this procedure. To control the foaming-out process, the use of a computer control system is proposed to adapt the pump rotation rate of the feed pumps in an appropriate manner via an actuator by a comparison of measured flow rates with reference data.

One perceived disadvantage with this procedure is that the polyurethane systems hitherto used for this purpose may not fill the mold out completely. It was more particularly determined in this connection that comparatively large voids can form in the foam. However, comparatively large voids or air inclusions reduce the insulation performance, and this is specifically problematic of late, since the demand for better and better refrigerator insulation continues to increase because of the lower energy requirements associated therewith.

It is an object of the present invention to provide a method for producing foamed molded bodies wherein the aforementioned disadvantages in the prior art are overcome. More particularly, the hollow body to be foamed out shall have a more homogeneous foam density distribution and no voids.

This object is achieved according to the present invention by a method for producing foamed molded bodies comprising the steps of A) providing a mold, and B) introducing a foam-forming reaction mixture into the mold under variable pressure of injection, wherein the method is characterized in that the foam-forming reaction mixture has a fiber time of $\geq 15$ s to $\leq 50$ s.

The present invention rests on the insight that employing a foam-forming reaction mixture having the aforementioned fiber time ensures voidless foaming out of bodies even when body geometries are complex. One possible reason for this is that the reaction mixtures employed according to the present invention have a comparatively short fiber time, so they begin to foam up even as the mold is being filled. These are accordingly also known as "fast systems". Systems of this type are known in principle from other application sectors in the form of two-part polyurethane systems for example. The setting speed here may be influenced, for example through the reactivity of the raw materials used and/or the choice of catalysts, such that the fiber times of the present invention are obtained.

The mold is thus foamed out to some extent even as it is being filled, so a rising foam front forms starting at the side where the reaction mixture was first exported. Once the foam has expanded to reach the ceiling of the mold, the air/gas volume in the mold is displaced by the foam front without the aforementioned air inclusion voids being able to form. Because of this, the method of the present invention can also be carried out under atmospheric pressure although vacuum techniques can also be used in principle.

It further transpired that the pore structure obtained on using such fast-setting systems is finer. A finer pore structure for a given foam material leads to improved insulation performance.

The fiber time is defined as follows in the context of this invention: The fiber time is experimentally determined by mixing the reactants of the reaction mixture with a customary laboratory stirrer at 1000 rpm and 20° C. and dipping a thin wooden spatula into the expanding reaction mixture at short intervals. The time from mixing the components to the time at which it is first possible to draw out strings with the spatula is the fiber time.

This laboratory fiber time must be distinguished from the so-called machine fiber time, which indicates the fiber time of the reaction mixture in the event of it being processed on a corresponding machine. Since, on a machine, the individual components are both mixed and introduced into the mold using a high pressure, heating of the reactants or the reaction mixture occurs in the process, so the machine fiber times are generally lower than the aforementioned fiber times determined in the lab at 20° C. A rough rule of thumb is that a fiber time determined in the laboratory at 20° C. must be multiplied by a factor of about 0.6 for a 150 bar injection pressure of the individual components, for example of a polyurethane mixture. In other words, a laboratory fiber time at 20° C. corresponds to a 150 bar machine fiber time of about 36 s.

The method of the present invention is particularly suitable for hollow bodies whose geometry is particularly demanding of the flow behavior of the reaction systems. This includes more particularly elongate geometries, geometries with high degrees of slenderness, with thin and narrow chambers as hollow bodies and also long distances from the importation locus of the reaction mixture to the distal flow path end of the hollow body to be filled.

The mold provided in step (A) of the method according to the present invention may have a closed shape or an open shape. "Open" here means that there are at least two side walls. The foam obtained may be removed from the mold or left in the mold for its final destination. A mold for producing one-piece insulation components of cooling appliances is particularly suitable for the purposes of the present invention. The mold is preferably disposed such that the reaction mixture introduced thereinto is able to spread out over the floor of the mold.

Introducing a foam-forming reaction mixture into the mold as per step (B) may be effected by the foam-forming reaction mixture being produced in a customary high-pressure mixing system and being introduced into the mold using a discharge pipe. The mixing system may comprise a mixing chamber fed with the individual components of the reaction mixture. The feed to the mixing chamber is via nozzles known per se, via which the components of the reaction mixture are introduced into the mixing chamber in the manner of the present invention using variable pressure. A further way to realize the variable pressure comprises a throttle means with which the outflow cross section of the reaction mixture from the mixing means in the direction of the mold, wherein the throttle means may also be placed downstream of the aforementioned mixing chamber. A discharge pipe or else two or more discharge pipes can be used per mold. After foam formation has ended, the reaction mixture cures to completion.

In other words, therefore, the injection pressure variation provided according to the present invention may be realized by varying the injection pressure of the individual components of the reaction mixture into the mixing chamber and/or by varying the outflow cross section, for example via a throttle means.

The method of the present invention further comprises introducing the foam-forming reaction mixture into the mold under variable pressure of injection. The term "variable" is to be understood as meaning that, as the reaction mixture is being introduced, active influence is exerted on the injection pressure, for example by varying the nozzle diameter, the feed rate or the feed pressure, to mention but a few possibilities. The term is not to be understood as referring to merely technically unavoidable fluctuations in a process otherwise carried out at constant pressure. More particularly, injection pressure variations of more than ±15% may be provided. A variable injection pressure is advantageous in that speedy and voidless foaming of the body is enabled specifically in the event of concurrent use of the fast-curing reaction systems provided according to the present invention.

In advantageous elaboration of the method according to the present invention, the foam-forming reaction mixture may be introduced into the mold at a temporally variable rate. This is to be understood as meaning that the mass flow of reaction mixture into the mold, as may be expressed in grams per second for example, is variable. The temporal variation may be linear or else follow other functions of time. This has the advantage over a constant injection quantity per unit of time that, with the latter, the mixture which reacts to form the polyurethane foam is applied in a comparatively confined region, but precisely this is disadvantageous with complex geometries for the cavity to be foamed out in that a more unfavorable predistribution of the reaction mixture becomes established and hence makes it impossible to obtain a homogeneous distribution for the foam.

The temporally constant importation of the reaction mixture into the mold gives, in figurative terms, an oval distribution for a reaction mixture injected horizontally onto the floor of a mold. By contrast, the aforementioned preferred temporal variation of the exportation rate is the reaction mixture in the form of an elongate strip. As a result, the expanding reaction mixture has to cover shorter distances to fill the mold. The flow path shortening leads to reduced material-related requirements and to more isotropic and/or more homogeneous foamed structures. In other words, a more even apparent density distribution is obtainable in the final foam. The strength properties of the foam are also improved, since shearing losses are minimized. This version of the method is especially advantageous in combination with the short fiber time foam systems provided according to the present invention, since these systems are on account of their short fiber time reliant on very short flow paths.

In this version, the temporal variation of the introduction rate and/or injection pressure of the foam-forming reaction mixture is effected by varying the power output of a pump motor acting on the reaction mixture, wherein the power output of the pump motor is effected in particular by varying the rotary speed of the motor using a frequency converter. One simple way to realize this is with a programmable logic controller (PLC) for the motor or motors. This includes, as will be appreciated, the scenario where two or more motors are used to influence two or more feed components of the foam-forming reaction mixture. The importation profile may be individually adjusted for each mold.

The foam-forming reaction mixture is preferably obtained from mixing two or more components in a mixing head and directly thereafter introduced into the mold. The exit orifice from the mixing head may simultaneously constitute the exportation pipe via which the mixture is introduced into the mold.

When the foam-forming reaction mixture is obtained from mixing two or more components in a mixing head and the mixing head comprises one or more injection nozzles, the variable injection pressure in the method of the present invention is the pressure which applies at the injection nozzles.

The mixing of liquid reaction components takes place in a mixing head in the case of polyurethane processing, and both high pressure mixing and low pressure mixing may be employed. In the high pressure mixing process, the use of which is preferred for the method described, the compressive energy of the reaction components which is generated by pumps is transformed into kinetic energy via nozzles. The components are injected into a comparatively small mixing chamber in the mixing head to spatially concentrate the kinetic energy and utilize it for mixing the reaction components. Customary injection pressures range from 90 to 200 bar, preferably from 120 to 170 bar, and produce flow velocities of about 140 to 180 m/s, depending on the density of the material. It may be provided here that the injection pressure is the same or different for the two reaction components. When identical nozzles are used for the polyol and isocyanate components of a polyurethane mixture, the desired mixing ratio between the two components may be set as desired. For example, the injection pressure setting for the isocyanate component may be about 20 bar higher than the injection pressure setting for the polyol component.

The method of the present invention may utilize mixing heads or injection nozzles for importing the reaction mixture into the mold whose opening cross section can or cannot be varied with regard to mixture output.

The foam-forming reaction mixture preferably comprises a polyol component and a polyisocyanate component, so a polyurethane foam is obtained. The foam may be an open-cell foam or a closed-cell foam. It is further favorable for the reaction mixture to have a low initial viscosity, for example of ≥300 mPas to ≤2000 mPas at the temperature prevailing during mixing.

In a further embodiment of the method according to the present invention, the foam-forming reaction mixture is obtained from the reaction of first and second reaction components and the first and second reaction components are each introduced via nozzles into a mixing chamber. In principle, any type of nozzle capable of realizing a variable injection pressure can be used for this. From the mixing chamber, the reaction mixture may then be introduced into the mold. The advantage of this procedure resides in a consistent quality of mixing for the two components. As mentioned above, the two components concern in particular a polyol system and a polyisocyanate.

In a further embodiment of the method according to the present invention, the foam-forming reaction mixture is chosen so as to obtain a rigid polyurethane foam. The term "rigid polyurethane foam" subsumes rigid polyurethane/isocyanurate foams. Useful starting components for producing rigid foams comprising urethane and/or isocyanurate groups are in particular:
a) aliphatic, cycloaliphatic, araliphatic, aromatic and heterocyclic polyisocyanates, preferably diphenylmethane diisocyanate (MDI) or polyphenyl polymethylene polyisocyanate (polymeric MDI), polyisocyanates comprising carbodiimide groups, urethane groups, allophanate groups, isocyanurate groups, urea groups or biuret groups, more preferably based on polyphenyl polymethylene polyisocyanate, and
b) compounds having at least two isocyanate-reactive hydrogen atoms with a molecular weight in the range from 400 g/mol to 10 000 g/mol, for example compounds comprising amino groups, thiol groups, hydroxyl groups or carboxyl groups. The preference here is for amino-started polyethylene glycols having primary hydroxyl groups.

The foams are obtainable using customary auxiliary and added substances such as catalysts, blowing agents, crosslinkers, flame retardants, foam stabilizers, flow enhancers and/or inhibitors.

According to the present invention, the foam-forming reaction mixture has a fiber time at 20° C. of ≥20 s to ≤60 s. The fiber time at 20° C. is preferably ≥25 s to ≤55 s, in particular in the range from ≥30 s to ≤50 s. The recited fiber times have the advantage that, in cooperation with the method of the present invention, molds can be filled rapidly, completely and, in particular, voidlessly.

In a further embodiment of the method according to the present invention, the time during which the foam-forming reaction mixture is introduced into the mold at a temporally variable rate is in particular ≥1 s to ≤20 s. This time may also be ≥5 s to ≤10 s.

It is further preferable in the process according to the present invention when the ratio of the time in which the form-foaming reaction mixture is introduced into the mold at a temporally variable rate to the cream time of the foam-forming reaction mixture is in the range from 0.1 to 10, in particular from 0.5 to 5. This makes it possible to align the rate of introduction with the cream time of the reaction mixture, in which case particularly a version wherein the injection distance of the reaction mixture into the mold is reduced as the reaction mixture is being introduced into the mold stops the reaction mixture from being shot into or through the already developing foam, which could have a disadvantageous effect on the foam structure. This holds for example when the injection pressure is reduced during the course of the reaction mixture being introduced into the mold.

The cream time is the time which elapses from mixing the components to the time where the incipient creaming of the reaction mixture becomes visually discernible in a shift in color to a lighter coloration and some initial foaming. It is determined visually. In a further embodiment of the method according to the present invention, the exit speed of the introduced foam-forming reaction mixture in step B) is ≥0.5 m/s to ≤6 m/s. This value is preferably in the range from ≥1 m/s to ≤5 m/s.

When the reaction mixture exits from a mixing head which is cleanable by an outlet-cleaning piston or ram, the exit speed from the mixing head is conveniently measured at the ram.

In a further, particularly preferred embodiment of the method according to the present invention, the exit speed of the introduced foam-forming reaction mixture decreases over time in step B). In other words, the mold to be foamed out is filled with the reaction mixture by initially introducing the reaction mixture at the position opposite the fill port and then continuously reducing the injection distance. This procedure is advisable with long, slender geometries for the mold, as encountered for example with housings for insulating elements of refrigerators. Otherwise, with a reverse sequence of filling such molds with particularly fast-setting reaction mixtures, it could happen, depending on the duration of the filling process, that fresh reaction mixture is shot through already foamed material, and this will be prejudicial to foam homogeneity. Decreasing input is also advisable where the volume to be filled is uniformly distributed across the full floor area of the mold.

In an alternative embodiment of the method according to the present invention, the exit speed of the introduced foam-forming reaction mixture increases in the course of step B). This is specifically advantageous with short, squat geometries for the mold.

In a further alternative embodiment of the method according to the present invention, the foam-forming reaction mixture is introduced into the mold at a temporally constant exit speed before and/or after step B). This makes it possible to obtain a ramp-shaped distribution of material in the mold. This is advantageous with high-volume regions at either end of the mold.

In a further preferred embodiment, the injection pressure is reduced over time in step B), in particular in a very substantially linear manner. For this the injection pressure may be reduced in particular by at least 10 bar/s, preferably by at least 15 bar/s, more preferably by at least 20 or even at least 25 bar/s. These values may similarly be used in the case of rising injection pressure. Other rates are also conceivable and depend on the desired initial and final pressures and also the duration of injection. Injection pressure variations that are optimum for particular reaction mixture and mold can be determined by a person skilled in the art in a few tests.

A suitable initial pressure is for example 170 bar+/−10 bar and a suitable final pressure is for example 90 bar+/−10 bar, while the time from the initial pressure to the final pressure is preferably 5 s or less, in particular 3 s or less. The aforementioned values of suitable initial and final pressures can also be targeted with increasing injection pressure, and then in reverse order. In this case, the aforementioned temporal variations in the injection pressure can be employed in the same way.

In further elaboration of the method according to the present invention, the foam-forming reaction mixture is introduced into the mold in step B) in horizontal direction, preference being about 2 mm to 50 mm above the floor. In horizontal application, the reaction mixture can spread particularly uniformly.

In a further embodiment of the method according to the present invention, the mold in cross section comprises a horizontally disposed floor volume and also vertically disposed volumes in communication with the floor volume. One-piece insulating elements for refrigerators are obtainable in this way. If the mold is filled with the reaction mixture, the reaction mixture initially spreads in the floor volume and then rises into the vertical volumes during foaming. These volumes or channels may likewise have dimensioning which extends across the full length or width of the mold. Exemplary thicknesses are between 20 mm and 200 mm, they may also be installed lines, channels, panels and tubes, which may change the cross-sectional thicknesses.

In further development of the method according to the present invention, the mold comprises a pipework line on the outside and a pipework line disposed therein on the inside and the foam-forming reaction mixture is introduced between the inside and outside pipework lines. This makes it possible to obtain insulated pipework lines. The inside pipework line transports the desired material and the outside pipework line serves as protective sleeve.

In a further embodiment of the method according to the present invention, the mold comprises two mutually spaced-apart areal elements and the foam-forming reaction mixture is introduced between these areal elements. Discontinuous panels of the type needed for insulation and fire control purposes are obtainable in this way. Either or both of the areal elements are preferably of metal.

In a preferred embodiment of the method according to the present invention, the foam-forming reaction mixture is introduced by a mixing head having a mixing chamber and furthermore the outflow cross section of the mixing chamber is varied during the introducing. This can be realized via suitable modifications to the mixing head and integration in a control program. For instance, the outflow from the mixing chamber can be partly closed by a piston which is displaceable in the efflux pipe by an actuator. This arrangement then serves as throttle means. The mixing quality of the reaction mixture can be kept consistent in this way in the face of changes in mass flows. In addition, the pressure of the reaction mixture flowing out into the mold can be varied in this way. When mixing heads having more than two nozzles per component are used, nozzle combinations make it possible in many cases to vary the output bandwidth across the full mixing head output performance to 1:6 or 6:1.

In a further elaboration of the method according to the present invention, the foam-forming reaction mixture comprises or consists of an emulsion, wherein the emulsion contains the following constituents:
(I) an isocyanate-reactive composition A containing a polyol mixture A1 of at least three polyols A1a, A1b and A1e as continuous phase
and
(II) at least a physical blowing agent T as disperse phase, wherein the following limitations apply:
(i) A1a is a polyether polyol having a hydroxyl number of 15 mg KOH/g to 550 mg KOH/g and having a functionality of 1.5 to 6.0, obtained by addition reaction of an epoxide onto one or more starter compounds selected from the group consisting of carbohydrates and di- or higher-functional alcohols;
(ii) A1b is a polyether polyol having a hydroxyl number of 100 mg KOH/g to 550 mg KOH/g and having a functionality of 1.5 to 5.0, obtained by addition reaction of an epoxide onto an aromatic amine;
(iii) A1e is a polyester polyether polyol having a hydroxyl number of 100 mg KOH/g to 450 mg KOH/g and having a functionality of 1.5 to 3.5, obtained by addition reaction of an epoxide onto the esterification product of an aromatic dicarboxylic acid derivative and a di- or more highly functional alcohol.

Employing such an emulsion in the context of the method according to the present invention is particularly advantageous because these emulsions have very short fiber times, i.e., in the range from 20 to 60 s at 20° C., and so are particularly useful for the variable injection pressure method of the present invention. The combination of dynamic introduction of the foam-forming reaction mixture in the form of this emulsion, i.e., at variable injection pressure, leads in the cured foams to very uniform and good insulation properties even in the case of irregularly shaped molded bodies such as a refrigerator housing, a freezer housing or the housing of a fridge-freezer combination. More particularly, the molded bodies obtained are very substantially free from voids even in the aforementioned scenarios, which likewise has a positive effect on insulation performance.

The use of the word "a" or "an" in connection with components of the present invention such as certain polyols, for example, is to be understood in the context of this invention as not necessarily implying that just one such component is present. Therefore, expressions such as "a polyol" or the like are only to be understood as meaning one polyol if this is expressly stated. It is conceivable, for example, that two polyols of the type A1a are present.

An "emulsion" for the purposes of the present invention is a finely divided mixture of two liquids in which one liquid (viz., the physical blowing agent T) is dispersed in the other liquid (viz., the polyol mixture A1) in the form of fine droplets having an average droplet size of ≥0.1 μm to ≤20 μm, while the droplet size is determined using an optical microscope in the bright field transmission mode. Such an emulsion differs not only from a genuine solution but also from a microemulsion. Microemulsions have a disperse phase which is so finely divided that there is no longer any light scattering. Such microemulsions accordingly appear clear and transparent in the region of visible light, whereas emulsions within the meaning of the present invention are cloudy and exhibit a pronounced level of light scattering. Moreover, microemulsions are only obtainable with the aid of emulsifying assistants, whereas the use of emulsifying assistants in the production of emulsions according to the present invention, although not foreclosed in principle, is also not absolutely necessary and therefore not preferred. In the present invention, the droplet size of blowing agent T is preferably ≥0.1 μm to ≤15 μm, more preferably ≥1 μm to ≤15 μm. This droplet size is determined using an optical microscope in the bright field transmission mode. Suitable layer thicknesses for this optical determination of the sample range from 20 μm to 40 μm.

By "physical blowing agents" are meant in the context of the present invention compounds which by virtue of their physical properties are readily volatile and do not react with the isocyanate component.

The "hydroxyl number" indicates the amount in milligrams of potassium hydroxide which is equivalent, in an acetylation, to the acetic acid quantity bound by one gram of substance. It is determined in the context of the present invention to the DIN 53240 standard as of December 1971.

"Functionality" in the context of the present invention refers to the theoretical functionality computed from the known feedstocks and their mixing ratios.

The present invention further provides a method of preparing a polyurethane-containing polymer C wherein an isocyanate component B is reacted with an emulsion of the present invention.

A "polyurethane-containing polymer C" is to be understood as meaning not only such polymers as contain polyurethane groups (PUR groups) only but also such polymers as additionally contain urea and/or polyisocyanurate groups (PIR groups).

The present invention further provides the polyurethane polymers C thus obtainable and also their use for insulation purposes.

It was found that, surprisingly, the combination of polyols A1a, A1b and A1c which the present invention provides actually reduces the overall viscosity of the isocyanate-reactive composition—and hence also the overall viscosity of the emulsion—relative to such isocynate-reactive compositions (polyol mixtures) of the prior art as form a solution with the physical blowing agent. It was further found that the stability of emulsions which are in accordance with the present invention can be distinctly raised by optimizing certain parameters (such as the level of oxyethylene groups in the polyols used). The right combination of optimized polyol emulsions with suitable NCO-terminated prepolymers further improves the heat conductivity numbers achieved. It was finally found that, surprisingly, the heat conductivity number of polymers C obtained using the combination of polyols A1a, A1b and A1c which is provided according to the present invention is further improved on producing said polymers C by the variable output method of the present invention.

The preparation of polyols A1a to A1c which are useful for the purposes of the present invention (and also of any further polyols; see hereinbelow) is known in principle to a person skilled in the art and has already been described extensively. Polyester polyols are obtained by polycondensation of dicarboxylic acid equivalents and low molecular weight polyols. Polyether polyols are obtained by polyaddition (anionic or cationic) of epoxides onto suitable starter compounds. The addition of epoxides onto polyester polyols leads to the polyester polyether polyols of the present invention. If necessary, the polymerization reactions are carried out in the presence of suitable catalysts known to a person skilled in the art.

In preferred embodiments, the polyether polyol A1a is started on sucrose, mixtures of sucrose and propylene glycol, mixtures of sucrose and ethylene glycol, mixtures of sucrose, propylene glycol and ethylene glycol, sorbitol or mixtures of sorbitol and glycerol. Preferred epoxides are 1,2-butylene oxide, 2,3-butylene oxide, ethylene oxide and propylene oxide, singly or mixed. Particular preference is given to ethylene oxide and propylene oxide, which can be used singly or both together, and in the latter case not only a random distribution of the oxyalkylene units derived respectively from ethylene oxide and propylene oxide but also the intentional preparation of block copolymers having a certain structure is conceivable. Mixtures of sucrose, propylene glycol and ethylene glycol are particularly preferred for use as starters. It is particularly preferable to use propylene oxide only as epoxide. It is particularly preferable for the hydroxyl number of A1a to be 100 mg KOH/g to 450 mg KOH/g and the functionality from 2.5 to 5.

In preferred embodiments, the polyether polyol A1b is started on ortho-, meta- or para-tolylenediamine or a mixture of the tolylenediamine isomers. It is particularly preferable to use ortho-tolylenediamine as starter. ortho-Tolylenediamine may be present as a mixture of the 2,3- and 3,4-isomers. In principle, however, the use of other aromatic amines is also conceivable, examples being benzenediamine (all isomers) or methylenediphenyldiamine (all isomers). Preferred epoxides are 1,2-butylene oxide, 2,3-butylene oxide, ethylene oxide and propylene oxide, singly or mixed. Particular preference is given to ethylene oxide and propylene oxide, which can be used singly or both together, and in the latter case not only a random distribution of the oxyalkylene units derived respectively from ethylene oxide and propylene oxide but also the intentional preparation of block copolymers having a certain structure is conceivable. It is particularly preferable to use propylene oxide alone or in admixture with ethylene oxide. In the latter case, the mass ratio of propylene oxide to ethylene oxide is in the range from 0.25:1 to 4:1 and most preferably from 0.5:1 to 2:1. Block copolymers are preferably terminated with propylene oxide.

In preferred embodiments, the aromatic dicarboxylic acid derivative used to prepare the polyol A1e is a phthalic acid derivative, more preferably phthalic anhydride.

Preferred di- or higher-functional alcohols for preparing the polyol A1ec are ethylene glycol and diethylene glycol including their higher homologs, 1,2-propanediol, dipropylene glycol and its higher homologs, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol including their higher homologs, 2-methyl-1,3-propanediol, neopentylglycol, 3-methyl-1,5-pentanediol, glycerol, pentaerythritol, 1,1,1-trimethylolpropane and carbohydrates having 5 to 12 carbon atoms (such as isosorbide for example). Ethylene glycol and diethylene glycol are very particularly preferred.

Ethylene oxide and propylene oxide are preferred epoxides used to prepare polyol A1e. They are used in such an amount that the level of oxyethylene groups is from 5% by mass to 50% by mass, preferably from 10% by mass to 40% by mass, more preferably from 15% by mass to 30% by mass, based on the overall mass of polyol A1e.

The polyol mixture A1 may contain still further polyols in certain embodiments. So there may additionally be (iv) a short-chain polyether polyol A1d started on an aliphatic amine or on a polyhydric alcohol and having a hydroxyl number of 500 mg KOH/g to 1000 mg KOH/g, preferably of 600 mg KOH/g to 950 mg KOH/g, more preferably of 700 mg KOH/g to 900 mg KOH/g and having a functionality of 1.5 to 5.0, preferably of 2.0 to 4.5, more preferably of 2.5 to 4.0. It is particularly preferable to obtain A1d by addition of epoxides onto ethylenediamine or trimethylolpropane. Ethylene oxide and propylene oxide are preferred epoxides, and propylene oxide is particularly preferred.

The polyol mixture A1 may further also contain (v) a di- to tetrafunctional aminic or alcoholic chain-extender or crosslinker A1e. A1e is preferably selected from glycerol, butanediol, ethylene glycol, diethylene glycol, propylene glycol, ethylenediamine, ethanolamine, triethanolamine, trimethylolpropane and pentaerythritol.

The polyol mixture A1 may additionally also utilize polyether carbonate polyols A1f, such as are obtainable for example by catalytic reaction of epoxides and carbon dioxide in the presence of H-functional starter substances (see for instance EP 2 046 861 A1). These polyether carbonate polyols generally have a functionality of not less than 1.0, preferably in the range from 2.0 to 8.0, more preferably from 2.0 to 7.0 and most preferably from 2.0 to 6.0. The number-averaged molar mass is preferably in the range from 400 g/mol to 10 000 g/mol and more preferably from 500 g/mol to 6000 g/mol.

The number-averaged molar mass $M_n$ in the context of this invention is determined by gel permeation chromatography to DIN 55672-1 of August 2007.

The physical blowing agent T is not subject to any in-principle restrictions save that under the prevailing boundary conditions (temperature, pressure) it not being soluble in polyol mixture A1 (because otherwise it would be impossible to obtain an emulsion). The physical blowing agents to be used for the purposes of the present invention are preferably selected from hydrocarbons (e.g. n-pentane, isopentane, cyclopentane, butane, isobutane), ethers (e.g., methylal), halogenated ethers, perfluorinated hydrocarbons of 1 to 8 carbon atoms (e.g., perfluorohexane, and also mixtures therebetween. A pentane isomer or a mixture of various pentane isomers is used as physical blowing agent T in particularly preferred embodiments. It is very particularly preferred to use cyclopentane as blowing agent T.

In particularly preferred embodiments, the emulsion of the present invention contains one each of polyols A1a, A1b and A1c and also, if present in each case, one each of polyols A1d, A1e and A1f. It is further preferable for there to be no further polyols present besides A1a, A1b and A1c and also, if present in each case, A1d, A1e and A1f; that is, polyol mixture A1 consists of not more than six polyols in preferred embodiments.

It is generally advantageous for isocyanate-reactive composition A to contain still further components in addition to the polyol mixture comprising A1. Such further components are known in principle to a person skilled in the art and include, for example, water, foam stabilizers, catalysts, flame retardants and also optionally further auxiliary and added substances. In particularly preferred embodiments, the isocyanate-reactive composition A further comprises (vi) water A2;
(vii) at least one foam stabilizer A3 selected from the group of polyether-polydimethylsiloxane copolymers, preferably polyether-polydimethylsiloxane copolymers functionalized with polyether side chains comprising propylene oxide and/or ethylene oxide;
and
(viii) at least one catalyst A4 selected from the group
triethylenediamine, N,N-dimethylcyclohexylamine, dicyclohexylmethylamine, tetra-methylenediamine, 1-methyl-4-dimethylaminoethylpiperazine, triethylamine, tributylamine, dimethylbenzylamine, N,N,N',N'-tris(dimethylaminopropyl)hexahydrotriazine, tris(dimethylaminopropyl)amine, tris(dimethylaminomethyl)phenol, dimethyl-aminopropylformamide, N,N,N',N'-tetramethylethylenediamine, N,N,N',N'-tetramethylbutanediamine, tetramethylhexanediamine, pentamethyldiethylenetriamine, pentamethyl-dipropylenetriamine, tetramethyldiaminoethyl ether, dimethylpiperazine, 1,2-dimethylimidazole, 1-azabicyclo[3.3.0]octane, bis(dimethylaminopropyl)urea, N-methylmorpholine, N-ethylmorpholine, sodium N-[(2-hydroxy-5-nonylphenyl)methyl]-N-methylaminoacetate, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, if necessary (when high polyisocyanurate fractions are desired) together with at least one catalyst selected from the group tin(II) acetate, tin(II) octoate, tin(II) ethylhexoate, tin(II) laurate, dibutyltin diacetate, dibutyltin dilaurate, dibutyltin maleate, dioctyltin diacetate, tris(N,N-dimethylaminopropyl)-s-hexahydrotriazine, tetramethylammonium hydroxide, sodium acetate, sodium octoate, potassium acetate, potassium octoate, sodium hydroxide.

The water here performs the function of a chemical co-blowing agent, i.e., its reaction with the isocyanate groups releases carbon dioxide, which acts as a blowing agent in addition to T.

To establish a stable emulsion, it is further advantageous to maintain certain quantitative ratios between blowing agent T and polyol mixture A1. In preferred embodiments, therefore, the invention provides an emulsion where the A1:T mass ratio is $\geq 5:1$ to $\leq 12:1$, preferably $\geq 10:1$ to $\leq 5:1$ and more preferably $\geq 9:1$ to $\leq 6:1$.

In preferred embodiments of the emulsion according to the present invention, the components of isocyanate-reactive composition A are present in the following mass fractions, each based on the overall mass of isocyanate-reactive composition A:

polyol A1a from 5% by mass to 60% by mass, preferably from 15% by mass to 50% by mass,
polyol A1b from 5% by mass to 60% by mass, preferably from 10% by mass to 50% by mass,
Polyol A1c from 5% by mass to 60% by mass, preferably from 15% by mass to 50% by mass,
Polyol A1d from 0%/a by mass to 20% by mass, preferably from 0% by mass to 15% by mass,
Polyol A1e from 0% by mass to 20% by mass, preferably from 0% by mass to 15% by mass,
Polyol A1f from 0% by mass to 20% by mass, preferably from 0% by mass to 15% by mass,
water A2 from 0% by mass to 5% by mass, preferably from 0.5% by mass to 3% by mass
foam stabilizer A3 from 1% by mass to 10% by mass, preferably from 1.5% by mass to 8% by mass
Catalyst A4 from 0.5% by mass to 5% by mass, preferably from 1% by mass to 4% by mass.

The emulsion of the present invention preferably contains polyol mixture A1 in a mass fraction of 80% by mass to 90% by mass and physical blowing agent T in a mass fraction of 10% by mass to 20% by mass, all based on the overall mass of the emulsion.

When a component is present in the form of two or more representatives (as for example in the case of a mixture of two physical blowing agents T, T1 and T2), the abovementioned mass fractions hold for the sum total of the particular representatives of a component (i.e., in the example of two physical blowing agents T, the sum total of the mass fractions of T1 and T2 in the emulsion is from 10% by mass to 20% by mass).

No further components are present in particularly preferred embodiments; that is, the emulsion consists with particular preference of at most A1a, A1b, A1c, A1d, A1e, A1f, A2, A3, A4 and T. It is very particularly preferable for the emulsion to consist of A1a, A1b, A1c, A2, A3, A4 and T.

The emulsions of the present invention are preferably formed by mixing the individual components of polyol mixture A1 (i.e., at least the polyols A1a, A1b and A1c, optionally further polyols and optionally auxiliary and additive substances as defined above) in any desired order, generally at ambient pressure and temperature, and then adding the blowing agent T to the polyol mixture A1 thus obtained.

The emulsions are obtainable, for example, by mixing the components for A with one another in any desired manner, typically at room temperature under ambient air pressure, and then adding the blowing agent T. Emulsification can be using for example a high-shear rate mixer such as a jet disperser or a rotor-stator disperser. Representative examples are indicated for example in Schubert, H. (editor); Emulgiertechnik; R. Behr's Verlag, Hamburg, 2005.

The emulsions of the present invention are notable for their high stability without this having to be paid for with an excessively raised viscosity. By "stable" in this context is meant that the emulsion can be stored at room temperature and atmospheric pressure for at least 2 hours, preferably for at least 1 day, more preferably for at least 3 days and most preferably for at least 5 days—without phase separation occurring between polyol mixture A1 and blowing agent T. The 25° C. viscosity of an isocyanate-reactive composition A according to the present invention is in the range from 1000 mPa s 15 to 18 000 mPa s, more preferably from 1500 mPa s to 12 000 mPa s and most preferably from 2000 mPa s to 12 000 mPa s. Viscosity here is determined to EN ISO 3219 as of October 1994.

The invention further provides a method of preparing a polyurethane-containing polymer C, wherein an isocyanate component B is reacted with an emulsion of the present invention, comprising polyol mixture A1 and a physical blowing agent T. The preparation of polyurethane-containing polymers from isocyanate components and isocyanate-reactive components in the presence of blowing agents and also optionally further auxiliary and added substances is known in principle to a person skilled in the art and has already been described extensively. The polyurethane-containing polymers C of the present invention are preferably prepared by methods known to a person skilled in the art. Examples are described in U.S. Pat. No. 2,764,565 and also in G. Oertel (editor) "Kunststoff-Handbuch", volume VII, Carl Hanser Verlag, 3$^{rd}$ edition, Munich 1993, pages 267 to 354, and also in K. Uhlig (editor) "Polyurethan Taschenbuch", Carl Hanser Verlag, 2$^{nd}$ edition, Vienna 2001, pages 83 to 102. The components may in principle be foamed to form the polyurethane-containing polymer C as known from the prior art cited by way of example.

In preferred embodiments of the method according to the present invention, said isocyanate component B is next a) at least one isocyanate B1 selected from the group consisting of
tolylene diisocyanate, diphenylmethane diisocyanate, polyphenyl polymethylene polydiisocyanate (PMDI), xylylene diisocyanate, naphthylene diisocyanate, hexamethylene diisocyanate, diisocyanatodicyclohexylmethane and isophorone diisocyanate,
or b) an isocyanate-terminated prepolymer B2 prepared from at least one polyisocyanate B1 and at least one isocyanate-reactive compound selected from at least one of the polyols A1a, A1b, A1c, A1d and A1f,
or c) a mixture of B1 and B2, The isocyanate index for the reaction of isocyanate component B with emulsion A is preferably in the range from 95 to 180, more preferably from 95 to 150 and yet more preferably from 100 to 130. The "isocyanate index" (or index for short) is the quotient formed by dividing the actually used amount-of-substance [in moles] of isocyanate groups by the amount-of-substance [in moles] of isocyanate groups which is stoichiometrically needed for complete conversion of all isocyanate-reactive groups and multiplying by 100. Since the reaction of 1 mole of an isocyanate-reactive group requires 1 mole of an isocyanate group, the following equation holds:

$$\text{index}=(\text{moles of isocyanate groups/moles of isocyanate-reactive groups})\times 100$$

The polyurethane-containing polymers C obtainable by the above-described method of the present invention form a further part of the subject matter of the present invention. These polyurethane-containing polymers C are obtainable via continuous or discontinuous methods of processing and are particularly suitable for use as insulating materials.

Polyurethane-containing polymers C obtained in a discontinuous manner are molded foams, which are delimited by decorative layers at both the top side and the bottom side. Useful decorative layers include inter alia metals, plastics, wood and paper. Possible fields of use for such discontinuously produced PUR composite elements are in particular the technical insulation of appliances such as refrigerators, freezer chests, fridge-freezer combinations and boilers, refrigerated containers and cool boxes and also pipes.

Continuously produced polyurethane-containing polymers C are continuously produced slabstock PUR foams of defined width and variable thickness, which are preferably delimited by a decorative layer at both the top side and the bottom side. In certain fields of use (as in building construction for example), however, decorative layers may also be completely eschewed. Useful decorative layers include particularly metals, metal foils, plastics, wood and paper. Possible fields of use for such continuously produced polyurethane-containing polymers C are in particular the technical insulation of cold-storage depots and thermal insulation in the building construction sector.

The use of polyurethane-containing polymers in these fields is known in principle to a person skilled in the art and has already been described extensively. The polyurethane-containing polymers C of the present invention are very useful for these purposes because they have low thermal conductivity numbers without processing problems due to excessively high viscosities having to be feared in producing the foams and/or applying them to suitable substrates (such as, for example, housings of cooling appliances or pipes). The present invention further provides a foamed molded body obtainable by a method of the present invention.

The invention additionally provides a refrigerator, a freezer or a fridge-freezer combination comprising a foamed molded body obtainable according to the present invention, wherein the provided mold is in particular a housing part of the refrigerator, of the freezer or of the fridge-freezer combination. The present invention is further elucidated with reference to the following examples and drawings without, however, being limited thereto. In said drawings:

Figure 1:
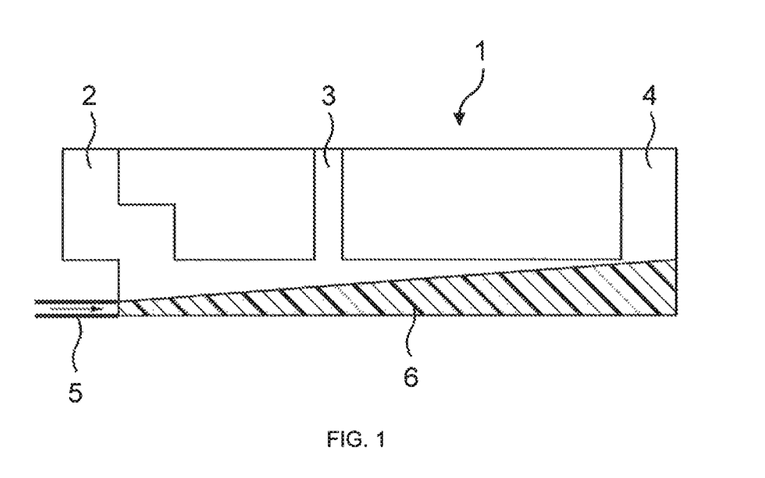
FIG. 1 shows a method of filling a mold with a foam-forming reaction mixture.

FIG. 1 shows in schematic form the state shortly after filling a mold 1 with a foam-forming reaction mixture 6. The mold 1 is executed as a hollow body and depicted in cross-sectional view. An insulating element for a combination of refrigerator and chest freezer may be concerned in the case of mold 1. The horizontally lying mold 1 thus has vertically disposed portions 2, 3 and 4. Portion 2 forms the floor portion, portion 3 separates the cooling compartment and the freezing compartment from each other, and portion 4 forms the head portion. A horizontally disposed floor volume is formed. The cavities of portions 2, 3 and 4 form vertically disposed volumes in communication with the floor volume.

To fill the mold, an output pipe 5 is connected to a corresponding inlet orifice of mold 1. The outlet 5 pipe fills a foam-forming reaction mixture 6, which preferably produces a polyurethane foam, into said mold. In the case depicted in FIG. 1, the reaction mixture 6 was initially introduced into the mold at high injection pressure which was thereafter reduced from 170 bar down to 120 bar in a continuous manner. The initially high injection pressure and the associated high exit speed of the reaction mixture from an undepicted mixing head serves to convey the reaction mixture 6 into the rear region of mold 1. Gradually reducing the injection pressure conveyed the reaction mixture 6 into the front part of mold 1. In this way, reaction mixture 6 is applied uniformly across the full length of mold 1.

Using a reaction mixture having the short fiber time of the present invention provides in this way the wedge-shaped profile depicted in FIG. 1 to reaction mixture 6, since foam formation in the rear part of mold 6 has already ensued during filling. The cavity in portion 4 of mold 1 is the first to be filled out with foam. A further onset of the foaming reaction will force material into the cavities of portions 3 and 2. This combines with an improved full-areal predistribution of the initially still liquid reaction mixture to produce more uniform flow path distances within mold 1. The result is a more homogeneous apparent density distribution and also more isotropic cellular geometries with improved mechanical and insulating properties within the foamed molded body obtained. In addition, the risk of void formation is appreciably reduced in this way.

Figure 2:
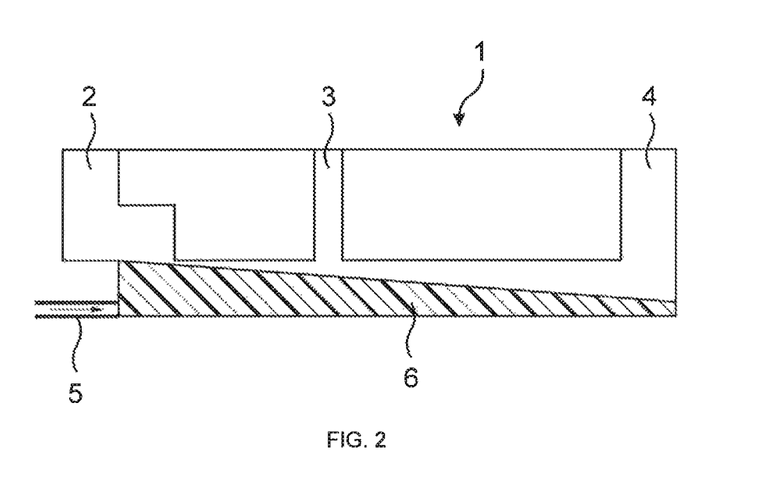
FIG. 2 shows an alternative method of filling a mold with a foam-forming reaction mixture.

FIG. 2 shows mold 1 being filled in a manner opposite to FIG. 1. The reaction mixture 6 was initially introduced at comparatively low injection pressure (120 bar) and then the injection pressure was raised to 170 bar. A comparatively large volume close to the inlet opening, as represented by the cavity of portion 2, can be efficiently reached in this way, for example.

Figure 3:
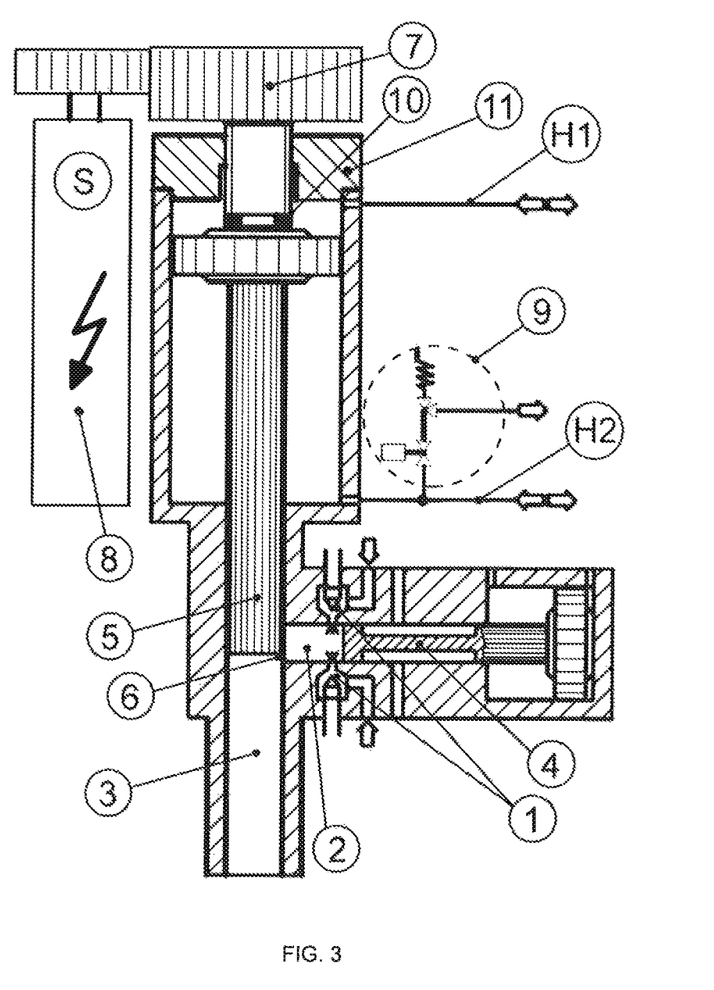
FIG. 3 shows a mixing head in a first operative position.

FIG. 3 depicts a mixing head for use with the method of the present invention. It is designed as a diverter type mixing head in the present case. The reaction components are each injected through nozzles 1 into a cylindrical mixing chamber 2 under an injection pressure which can be set separately for the two components and is varied during the course of the foaming operation. The reaction components become mixed in the cylindrical mixing chamber 2 through kinetic energy and then flow via a 90° diversion into an outflow pipe 3, the cross-sectional area of which increases significantly and thereby causes a flow quiescence of the mixed stream.

After the discharge of the mixture has ended, the component streams are switched into a recirculation position via grooves in a control piston 4. At the same time, the control piston 4 removes mixture residues from the mixing chamber 2 into the outflow pipe. This is followed by outflow pipe 3 being cleaned via a further ram 5. The switching operations are accomplished via schematically drawn hydraulics "H1" and "H2" at pressures of about 100 to 160 bar in order that fast but also forceful switching movements may be realized.

In addition to a cleaning function, the cleaning ram 5 also forms as throttle means. Usually, a stroke limiter which is manually adjustable via a fine thread will be used to stop limit the displacement path of ram 5 in such a way that the lower ram end in the flow direction creates an superimposition with the transition between mixing chamber 2 and outflow pipe 3. The free outlet cross section 6 varies with the degree of superimposition to influence the quality of mixing as well as the mixing chamber pressure level.

The mixture output is severely restricted in the operation position shown in FIG. 3. In the present mixing head, the manual hand adjuster has been removed and replaced with a gear pair 7. A servomotor "S" 8 is secured to the mixing head housing and forms a positive connection with the stroke limiter via the gear pair 7, and is integrated in the control system for the installation.

To reduce the sticking and rubbing resistances acting on the adjusting thread, the hydraulic switching pressure of the cleaning ram 5 is reduced to <10 bar via a bypass circuit 9 during the mixture exit phase. An axial ball bearing 10 protects the contact face between the travel stop and the hydraulic piston from momentum transfers. Therefore, depending on the direction of movement, the hydraulic pressure only serves to reposition the hydraulic piston against the variable stroke limiter, or to fix its position against the stop face.

On completion of the exit of the mixture, the servomotor 8 drives the stroke limiter into the upper end position, while the axial ball bearing 10 is plunged into the upwardly limiting cylindrical plate 11. In this position, the bypass valve closes and the cleaning ram 5 can be operated at the usual hydraulic pressure. The use of a servomotor achieves a highly precise and reproducible throttle position which can be adjusted according to the mixture output over the mixture output time.

Figure 4:
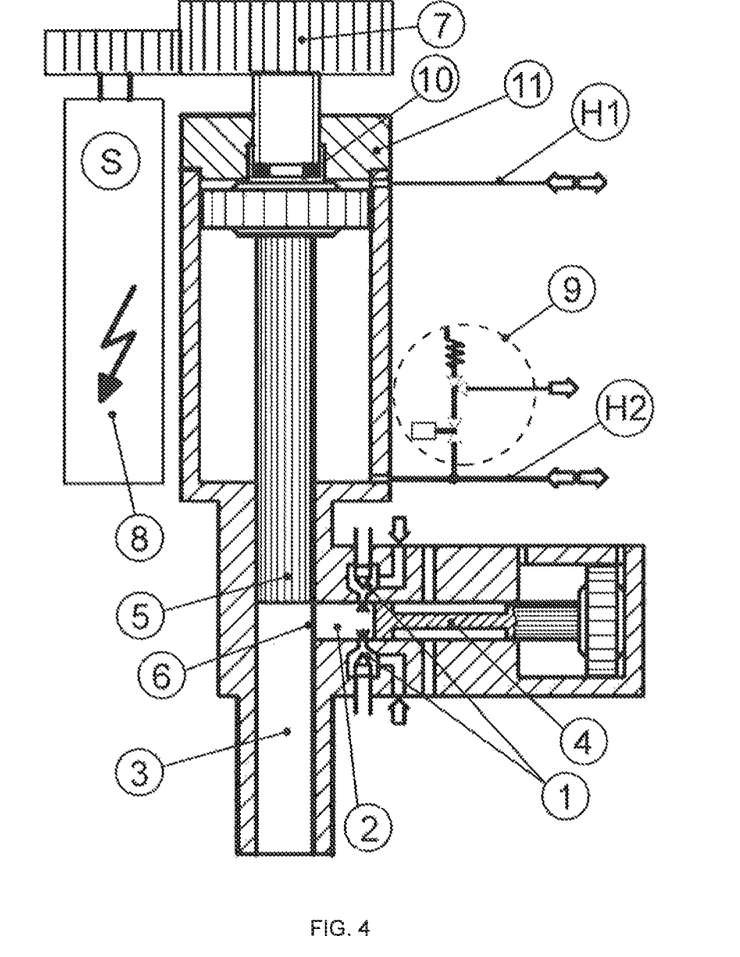
FIG. 4 shows the mixing head of FIG. 3 in a second operative position, and also

FIG. 4 shows the mixing head as per FIG. 3, except that the free outlet cross section 6 is larger because of the different position of ram 5. Mixture output is unrestricted as a result.

Figure 5:
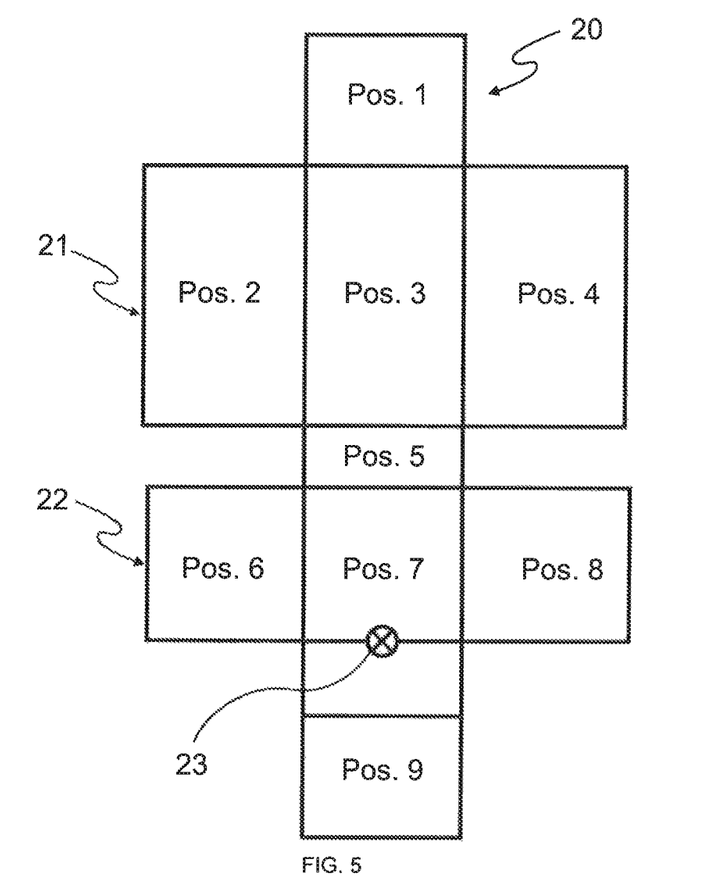
FIG. 5 shows a housing mold in unfolded depiction.

FIG. 5 shows a housing mold 20 for a fridge-freezer combination with a refrigerating region 21 and a freezing region 22 for the foaming tests of the present invention in unfolded depiction. The mold 20 corresponds to the common dimensions of a fridge-freezer combination and has an empty volume of 164 L. The individual walls are identified by the positional references Pos. 1 to Pos. 9. The mold 20 is filled with a polyurethane reaction mixture as described hereinbelow at an inlet position 22 on the compressor stage of the fridge-freezer combination.

EXAMPLES A

The rigid PUR foams of the present invention are formed by the one-shot process known to a person skilled in the art, wherein the reaction components are continuously or discontinuously reacted with one another and then cured in/on suitable molds/substrates. This process has been described, for example in U.S. Pat. No. 2,761,565 A, in G. Oertel (editor) "Kunststoff-Handbuch", volume VII, Carl Hanser Verlag, 3$^{rd}$ edition, Munich 1993, pages 267 ff., and also in K. Uhlig (editor) "Polyurethan Taschenbuch", Carl Hanser Verlag, 2$^{nd}$ edition, Vienna 2001, pages 83-102.

In the present case, the 2-part recipes consisting of a blowing agent-containing polyol formulation 1 or 2 as per table 1 and an isocyanate were processed using a conventional high pressure machine (HK 650 from Hennecke) and high pressure mixing head (MX 18 from Hennecke). The FIG. 5 housing mold to be foamed out corresponds to the common dimensions of a fridge-freezer combination and has an empty volume of 164 L. Importation took place at the compressor stage. Mold temperature was 38-40° C., the raw materials at a temperature of 20-22° C.

The following materials were used:
polyol 1: polyether polyol having an OH number of 450 mg KOH/g, a theoretical functionality of 4.7 and a viscosity of 15 000 mPas at 25° C. (Bayer MaterialScience);
polyol 2: polyether polyol having an OH number of 380 mg KOH/g, a theoretical functionality of 4.6 and a viscosity of 5350 mPas at 25° C. (Bayer MaterialScience);
polyol 3: polyether polyol having an OH number of 400 mg KOH/g, a theoretical functionality of 4.0 and a viscosity of 26 500 mPas at 25° C. (Bayer MaterialScience);
polyol 4: polyether polyol having an OH number of 112 mg KOH/g, a theoretical functionality of 2.0 and a viscosity of 140 mPas at 25° C. (Bayer MaterialScience);
polyol 5: aromatic polyether ester polyol having an OH number of 300 mg KOH/g, a theoretical functionality of 2.0 and a viscosity of 6500 mPas at 25° C., obtained from the reaction of phthalic anhydride with diethylene glycol and subsequent ethoxylation (Bayer MaterialScience);
stabilizer: Tegostab® (Evonik)
amine catalyst: tertiary amines that are standard catalysts in PUR chemistry and very well known to a person averagely skilled in the art
isocyanates: polymeric MDI (Desmodur® 44V20L, Bayer MaterialScience)

Polyol formulations 1 and 2 had the following compositions:

TABLE 1

Processing recipes, particulars in parts by weight.

| Polyol formulations: | Formulation 1 | Formulation 2 |
|---|---|---|
| polyol 1 | 43.0 | 35 |
| polyol 2 |  | 35 |
| polyol 3 | 42.0 | 25 |
| polyol 4 | 5.0 | 5 |
| polyol 5 | 10.0 |  |
| water | 2.0 | 2.4 |
| stabilizer | 2.0 | 1.7 |
| amine catalyst | 3.2 | 1.7 |
| Recipes: | Recipe 1 | Recipe 2 |
| formulation 1 | 100 |  |
| formulation 2 |  | 100 |
| cyclopentane | 16.0 | 13.5 |
| isocyanate | 130 | 143 |

The tests were carried out such that the output rate of the machine could be varied throughout the entire mold-filling time. For this, the output rate was varied in a linear manner from output rate 1 at the start of the shot to output rate 2 at the end of the shot, if necessary (cf. table 2). Tests were carried out both with increasing output rate and with decreasing output rate. Minimum and maximum output rates were further adjusted such that the delivery times needed for the delivery of a constant mass were <10 s, ≥10 s, ≥15 s and ≥20 s. The processing parameters are summarized in table 2.

TABLE 2

Processing parameters of machine tests with dynamic input.

| | | Example | | | | | | |
|---|---|---|---|---|---|---|---|---|
| | | 1 (inv.) | 2 (comp.) | 3 (comp.) | 4 (inv.) | 5 (inv.) | 6 (inv.) | 7 (comp.) |
| recipe 1 | | X | | X | X | X | X | X |
| recipe 2 | | | X | | | | | |
| cream time | s | 5 | 5 | 5 | 5 | 5 | 5 | 5 |
| fiber time | s | 27 | 39 | 28 | 30 | 27 | 27 | 29 |
| apparent free-rise density | kg/m$^3$ | 22.2 | 23.1 | 22.0 | 21.0 | 22.3 | 22.2 | 21.0 |
| apparent feed density | kg/m$^3$ | 36.4 | 36.0 | 36 | 35.8 | 36.5 | 35.8 | 35.8 |
| input time | s | 7.2 | 7.6 | 20.0 | 15.0 | 10.0 | 7.3 | 6.1 |
| output rate 1 | g/s | 960 | 960 | 580 | 608 | 960 | 608 | 960 |
| output rate 2 | g/s | 608 | 608 | 0 | 175 | 175 | 960 | — |
| input time/cream time | | 1.4 | 1.5 | 4 | 3.8 | 2 | 1.5 | 1.4 |
| output speed 1 | m/s | 3.8 | 3.8 | 2.3 | 2.4 | 3.8 | 2.4 | 3.8 |
| output speed 2 | m/s | 2.4 | 2.4 | 0.0 | 0.8 | 0.8 | 3.8 | — |

Foam properties were measured at the positions identified as Pos. 1 to Pos. 9 in FIG. 5 after foam cure. The results are summarized below in table 3.

TABLE 3

Results of machine tests.

| | Example | | | | | | |
|---|---|---|---|---|---|---|---|
| | 1 (inv.) | 2 (comp.) | 3 (comp.) | 4 (inv.) | 5 (inv.) | 6 (inv.) | 7 (comp.) |
| Thermal conductivity number at 10° C. midpoint temperature [mWm$^{-1}$K$^{-1}$]: | | | | | | | |
| Pos 1 | 18.53 | 19.07 | — | — | — | 18.27 | 18.51 |
| Pos 2 | 18.22 | 18.78 | — | 19.24 | 18.68 | 18.28 | 18.51 |
| Pos 3 | 18.48 | 19.10 | — | 20.13 | 19.18 | 18.36 | 18.57 |
| Pos 4 | 18.20 | 18.87 | — | 19.02 | 18.65 | 18.46 | 18.40 |
| Pos 5 | 18.33 | 18.88 | — | 18.22 | 18.22 | 18.25 | 18.19 |
| Pos 6 | 18.60 | 19.10 | — | 18.56 | 18.66 | 19.28 | 18.86 |
| Pos 7 | 18.28 | 18.88 | — | 18.77 | 18.80 | 18.24 | 18.47 |
| Pos 8 | 18.87 | 18.73 | — | 18.65 | 18.88 | 19.32 | 19.05 |
| Pos 9 | 18.65 | 18.99 | — | 18.55 | 18.59 | 19.42 | 19.00 |
| MW | 18.46 | 18.93 | — | 18.89 | 18.71 | 18.65 | 18.62 |
| STABW | 0.22 | 0.14 | — | 0.59 | 0.27 | 0.52 | 0.31 |
| Apparent core density [kg/m$^3$]: | | | | | | | |
| Pos 1 | 32 | 31 | — | — | — | 33 | 32 |
| Pos 2 | 32 | 33 | — | 31 | 32 | 34 | 33 |
| Pos 3 | 33 | 34 | — | 30 | 32 | 32 | 33 |
| Pos 4 | 32 | 32 | — | 30 | 31 | 32 | 32 |
| Pos 5 | 33 | 34 | — | 31 | 33 | 31 | 32 |
| Pos 6 | 32 | 32 | — | 32 | 34 | 30 | 31 |
| Pos 7 | 33 | 33 | — | 33 | 34 | 31 | 32 |
| Pos 8 | 32 | 32 | — | 32 | 34 | 30 | 31 |
| Pos 9 | 33 | 34 | — | 33 | 36 | 30 | 31 |
| MW | 32.4 | 32.8 | — | 31.5 | 33.3 | 31.4 | 31.9 |
| STABW | 0.53 | 0.93 | — | 1.20 | 1.58 | 1.42 | 0.83 |
| Assessment of foam distribution: | | | | | | | |
| surface | voidless | voidless | severely disrupted | voids at Pos. 1-4 | voids at Pos. 1-4 | voids at Pos. 6-9 | voids at Pos. 6-9 |
| generally | — | — | mold only filled up to Pos. 5, severe shrinkage | Pos. 1 not filled, shrinkage at Pos. 1-4 | shrinkage too severe at Pos. 1 | — | — |

Example 1 was carried out in accordance with the present invention by processing the fast polyol formation 1 with dynamic input and a gradient optimized to the housing geometry used. The distribution of the apparent core densities and of the thermal conductivities found is plainly best in Example 1, as is clear from the low standard deviation of 0.53. By contrast, mean thermal conductivity and thermal conductivity standard deviation are worse in Example 7, emphasizing the positive influence of an optimum predistribution as in Example 1.

Example 7 was carried out with a constant output, as generally customary in the refrigerator industry, without optimizing the distribution. The disadvantage with this procedure, viz., of continued input into the already expanding mixture, is also apparent from the distinctly worse voidage compared with Example 1. Example 6 was carried out using the same gradient for the dynamic injection as in Example 1 with the fast polyol formulation 1 except that this time the gradient was traversed in the opposite direction, from minimum output rate to maximum output rate. The disadvantages show up in the worse voidage at positions 6 to 9 and in the poorer apparent core density distribution associated with an altogether higher average thermal conductivity, i.e., a worse insulating effect.

Examples 3, 4 and 5 were each carried out using dynamic output in that the output rates were in each case adjusted such so as to produce input times of 20 s, 15 s and 10 s. The predistribution in the case of Example 3 was so bad that the housing mold could not be filled out, since the foam only flowed as far as position 5. With shorter input times, as in Examples 4 and 5, the housing mold was almost (Example 4) and completely (Example 5) filled. However, these moldings each exhibited some severe shrinkage at position 1, so no values could be determined for this position. Distinct voids were further apparent at positions 1 to 4 at the far end of the flow path. The poor predistribution of the reaction mixture is evident from the distinctly higher mean thermal conductivities and from the greater scatter in thermal conductivity and apparent density.

Example 2 was carried out by processing the slower polyol formulation 2 in recipe 2 under identical conditions to recipe 1 in example 1. The effectiveness of the injection procedure according to the present invention becomes clear here, since although mean thermal conductivity differs by about +0.5 mWm$^{-1}$K$^{-1}$ from that of Example 1, the scatter is minimal at a standard deviation of 0.14. Comparing the results of Example 2 with those of Example 4 reveals that dynamic injection with a less reactive recipe gives better results with regard to foam distribution, surface quality and voidage than with a fast one for comparable mean thermal conductivities.

EXAMPLES B

General tests were also carried out on insulating elements for fridge-freezer combinations. The objective of these tests was to investigate which methods can be used to minimize the amount of foam-forming reaction mixture needed for homogeneous foaming out of the mold. The results of using a rigid polyurethane system blown with liquid blowing agent were visually assessed by technically trained personnel. The mold to be foamed out was the same in each case.

Cream time was determined visually. A qualified person observed the reaction mixture after exit from the mixing head. The cream time is the time which elapses from mixing the components to the time where the incipient creaming of the reaction mixture becomes visually discernible in a shift in color to a lighter coloration and some initial foaming.

Fiber time is determined by mixing the reactants of the reaction mixture with one another at 20° C. and dipping a thin spatula of wood into the expanding reaction mixture at short intervals. The time from mixing the components to the time at which it is first possible to draw out strings with the spatula is the fiber time.

EXAMPLE 8 (IN ACCORDANCE WITH THE PRESENT INVENTION)

Example 8 was carried out by filling the mold with reaction mixture using an initial injection pressure for the individual components of 170 bar into mixing chamber 2 of a mixing head depicted in FIG. 3 while continuously reducing the injection pressure down to a final value of 90 bar over a period of 3 s. This corresponds to an injection pressure change rate of about 26.7 bar/s. The reaction mixture had a fiber time of 30 s at 20° C. The injection pressure was decreased in a linear manner as far as practically possible. Altogether 4940 g of reaction mixture were introduced. The mold was continually foamed out. More particularly, even the upper edges were crisply contoured and the foam was fine-cell and voidless.

EXAMPLE 9 (COMPARATOR)

The mold was again filled with 4940 g of reaction mixture using the same mixing head as in Example 8 but in this case at a constant injection pressure of 150 bar for the individual components. The reaction mixture had a fiber time of 50 s. On completion of the foaming operation, the absence of material was noted at the upper end of the insulating element due to incomplete foaming. The foam was also conspicuously more coarse-cell than the foam of Example 8.

The invention claimed is:

1. A method for producing foamed molded bodies comprising the steps of
    A) providing a mold, and
    B) introducing a foam-forming reaction mixture from a mixing head into the mold under variable pressure of injection, wherein the foam-forming reaction mixture exits the mixing head at a speed which decreases over time from an initial exit speed to a decreased exit speed, wherein the initial exit speed and the decreased exit speed are each in the range of >1 m/s to <5 m/s, and
    wherein the foam-forming reaction mixture has a fiber time at 20° C. of ≥20 s to ≤60 s
    wherein the foam-forming reaction mixture comprises an emulsion, and wherein the emulsion contains the following constituents:
    (I) an isocyanate-reactive composition A containing a polyol mixture A1 of at least three polyols A1a, A1 and A1e as continuous phase and
    (II) at least one physical blowing agent T as disperse phase,
    wherein:
    (i) A1a is a polyether polyol having a hydroxyl number of 15 mg KOH/g to 550 mg KOH/g and having a functionality of 1.5 to 6.0, obtained by addition reaction of an epoxide onto one or more starter compounds selected from the group consisting of carbohydrates and di- or higher-functional alcohols;
    (ii) A1b is a polyether polyol having a hydroxyl number of 100 mg KOH/g to 550 mg KOH/g and having a functionality of 1.5 to 5.0, obtained by addition reaction of an epoxide onto an aromatic amine; and
    (iii) A1e is a polyester polyether polyol having a hydroxyl number of 100 mg KOH/g to 450 mg KOH/g and having a functionality of 1.5 to 3.5, obtained by addition reaction of an epoxide onto the esterification product of an aromatic dicarboxylic acid derivative and a di- or more highly functional alcohol.

2. The method as claimed in claim 1, wherein the foam-forming reaction mixture is introduced into the mold at a temporally variable rate.

3. The method as claimed in claim 1, wherein the ratio of the time in which the foam-forming reaction mixture is introduced into the mold at a temporally variable rate to the cream time of the foam-forming reaction mixture is in the range from 0.1 to 10.

4. The method as claimed in claim 1, wherein the temporal variation of the introduction rate and/or injection pressure of the foam-forming reaction mixture is effected by varying the power output of a pump motor acting on the reaction mixture.

5. The method as claimed in claim 1, wherein the foam-forming reaction mixture is obtained from the reaction of a first reaction component comprising said emulsion and a second reaction component and the a first reaction component comprising said emulsion and a second reaction component are each introduced via nozzles into a mixing chamber in said mixing head.

6. The process as claimed in claim 1, wherein the foam-forming reaction mixture has a fiber time of ≥25 s to ≤55 s.

7. The method as claimed in 1, wherein the injection pressure is reduced over time in step B).

8. The method as claimed in claim 1, wherein the injection pressure in step B) is varied by at least 15 bar/s.

9. The method as claimed in claim 1, wherein the mold in cross section comprises a horizontally disposed floor volume and also vertically disposed volumes in communication with the floor volume.

10. The method as claimed in claim 1, wherein the mold comprises a pipework line on the outside and a pipework line disposed therein on the inside and the foam-forming reaction mixture is introduced between the inside and outside pipework lines.

11. The method as claimed in claim 1, wherein the mold comprises two spaced-apart areal elements and the foam-forming reaction mixture is introduced between these areal elements.

12. The method as claimed in claim 1, wherein the foam-forming reaction mixture is introduced by the mixing head having a mixing chamber and wherein furthermore the outflow cross section of the mixing chamber is varied during the introducing.

13. The method as claimed in claim 1, wherein the at least one physical blowing agent T is at least one member selected from the group consisting of hydrocarbons, halogenated ethers and perfluorinated hydrocarbons having from 1 to 8 carbon atoms each.

14. A foamed molded body obtainable by a method as claimed in claim 1.

15. A refrigerator, a freezer or a fridge-freezer combination comprising a foamed molded body as claimed in claim 14.

16. The method as claimed in claim 2, wherein the time during which the foam-forming reaction mixture is introduced into the mold at a temporally variable rate is ≥1 s to ≤20 s.

17. The method according to claim 3, wherein the ratio of the time in which the foam-forming reaction mixture is introduced into the mold at a temporally variable rate to the cream time of the foam-forming reaction mixture is in the range from 0.5 to 5.

18. The method as claimed in claim 4, wherein the power output of the pump motor is effected by varying the rotary speed of the motor using a frequency converter.

19. The method as claimed in claim 5, wherein the foam-forming reaction mixture is selected so as to obtain a rigid polyurethane foam.

20. The process as claimed in claim 6, wherein the foam-forming reaction mixture has a fiber time of ≥30 s to ≤50 s.

21. The method as claimed in 7, wherein the injection pressure is reduced over time in step B) in a very substantially linear manner.

22. The method as claimed in claim 8, wherein the injection pressure in step B) is varied by at least 20 bar/s.

23. The refrigerator, freezer or fridge-freezer combination as claimed in claim 15, wherein the provided mold is a housing component of the refrigerator, of the freezer or of the fridge-freezer combination.

* * * * *